United States Patent
Park et al.

(10) Patent No.: US 9,680,591 B2
(45) Date of Patent: Jun. 13, 2017

(54) METHOD FOR REPORTING CHANNEL STATE INFORMATION HAVING REFLECTED INTERFERENCE CANCELLATION CAPABILITY THEREIN, AND APPARATUS THEREFOR

(71) Applicant: LG Electronics Inc., Seoul (KR)

(72) Inventors: Hanjun Park, Seoul (KR); Kijun Kim, Seoul (KR); Hyungtae Kim, Seoul (KR); Hyunho Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 140 days.

(21) Appl. No.: 14/640,188

(22) Filed: Mar. 6, 2015

(65) Prior Publication Data

US 2015/0256280 A1 Sep. 10, 2015

Related U.S. Application Data

(60) Provisional application No. 61/949,261, filed on Mar. 7, 2014.

(51) Int. Cl.
*H04J 11/00* (2006.01)
*H04B 7/06* (2006.01)
*H04B 7/0456* (2017.01)
*H04B 7/024* (2017.01)

(52) U.S. Cl.
CPC ............ *H04J 11/005* (2013.01); *H04B 7/024* (2013.01); *H04B 7/0456* (2013.01); *H04B 7/0626* (2013.01); *H04B 7/0632* (2013.01)

(58) Field of Classification Search
None
See application file for complete search history.

(56) References Cited

U.S. PATENT DOCUMENTS

| 2014/0153488 | A1* | 6/2014 | Koivisto | H04B 1/10 370/328 |
| 2014/0204857 | A1* | 7/2014 | Mallik | H04L 1/0009 370/329 |
| 2015/0296540 | A1* | 10/2015 | Yum | H04J 11/00 370/329 |

(Continued)

*Primary Examiner* — Hassan Kizou
*Assistant Examiner* — Hashim Bhatti
(74) *Attorney, Agent, or Firm* — Morgan, Lewis & Bockius LLP

(57) ABSTRACT

A method for reporting channel state information (CSI) having reflected interference cancellation capability therein in a wireless communication system is performed by a terminal and includes receiving interference configuration information indicating a first group of cells corresponding to targets for which interference cancellation capability is reflected, and scheduling information of a serving cell, from the serving cell, receiving a specific sequence transmitted from a second group of cells, determining whether to reflect the interference cancellation capability for the first group of cells and the second group of cells, using the interference configuration information, the scheduling information or the specific sequence, and transmitting CSI having reflected the interference cancellation capability therein, wherein the second group of cells correspond to candidate cells capable of reflecting the interference cancellation capability other than the indicated cells.

14 Claims, 8 Drawing Sheets

(56) References Cited

U.S. PATENT DOCUMENTS

2016/0080094 A1* 3/2016 Kim ................. H04L 5/001
                                                            455/63.1
2016/0192373 A1* 6/2016 Li ................. H04L 25/03343
                                                            370/329

* cited by examiner

METHOD FOR REPORTING CHANNEL STATE INFORMATION HAVING REFLECTED INTERFERENCE CANCELLATION CAPABILITY THEREIN, AND APPARATUS THEREFOR

This application claims the benefit of U.S. Provisional Application No. 61/949,261, filed on Mar. 7, 2014, which is hereby incorporated by reference as if fully set forth herein.

BACKGROUND OF THE INVENTION

Field of the Invention

The present invention relates to a wireless communication system and, more particularly, to a method for reporting channel state information (CSI) having reflected interference cancellation capability therein, and an apparatus therefor.

Discussion of the Related Art

Recently, various devices requiring machine-to-machine (M2M) communication and high data transfer rate, such as smartphones or tablet personal computers (PCs), have appeared and come into widespread use. This has rapidly increased the quantity of data which needs to be processed in a cellular network. In order to satisfy such rapidly increasing data throughput, recently, carrier aggregation (CA) technology which efficiently uses more frequency bands, cognitive ratio technology, multiple antenna (MIMO) technology for increasing data capacity in a restricted frequency, multiple-base-station cooperative technology, etc. have been highlighted. In addition, communication environments have evolved such that the density of accessible nodes is increased in the vicinity of a user equipment (UE). Here, the node includes one or more antennas and refers to a fixed point capable of transmitting/receiving radio frequency (RF) signals to/from the user equipment (UE). A communication system including high-density nodes may provide a communication service of higher performance to the UE by cooperation between nodes.

A multi-node coordinated communication scheme in which a plurality of nodes communicates with a user equipment (UE) using the same time-frequency resources has much higher data throughput than legacy communication scheme in which each node operates as an independent base station (BS) to communicate with the UE without cooperation.

A multi-node system performs coordinated communication using a plurality of nodes, each of which operates as a base station or an access point, an antenna, an antenna group, a remote radio head (RRH), and a remote radio unit (RRU). Unlike the conventional centralized antenna system in which antennas are concentrated at a base station (BS), nodes are spaced apart from each other by a predetermined distance or more in the multi-node system. The nodes can be managed by one or more base stations or base station controllers which control operations of the nodes or schedule data transmitted/received through the nodes. Each node is connected to a base station or a base station controller which manages the node through a cable or a dedicated line.

The multi-node system can be considered as a kind of Multiple Input Multiple Output (MIMO) system since dispersed nodes can communicate with a single UE or multiple UEs by simultaneously transmitting/receiving different data streams. However, since the multi-node system transmits signals using the dispersed nodes, a transmission area covered by each antenna is reduced compared to antennas included in the conventional centralized antenna system. Accordingly, transmit power required for each antenna to transmit a signal in the multi-node system can be reduced compared to the conventional centralized antenna system using MIMO. In addition, a transmission distance between an antenna and a UE is reduced to decrease in pathloss and enable rapid data transmission in the multi-node system. This can improve transmission capacity and power efficiency of a cellular system and meet communication performance having relatively uniform quality regardless of UE locations in a cell. Further, the multi-node system reduces signal loss generated during transmission since base station(s) or base station controller(s) connected to a plurality of nodes transmit/receive data in cooperation with each other. When nodes spaced apart by over a predetermined distance perform coordinated communication with a UE, correlation and interference between antennas are reduced. Therefore, a high signal to interference-plus-noise ratio (SINR) can be obtained according to the multi-node coordinated communication scheme.

Owing to the above-mentioned advantages of the multi-node system, the multi-node system is used with or replaces the conventional centralized antenna system to become a new foundation of cellular communication in order to reduce base station cost and backhaul network maintenance cost while extending service coverage and improving channel capacity and SINR in next-generation mobile communication systems.

SUMMARY OF THE INVENTION

Accordingly, the present invention is directed to a method for reporting channel state information (CSI) having reflected interference cancellation capability therein, and an apparatus therefor, which substantially obviate one or more problems due to limitations and disadvantages of the related art.

An object of the present invention is to provide a method for reporting channel state information (CSI) having reflected interference cancellation capability therein, and an apparatus therefor.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a method for reporting channel state information (CSI) having reflected interference cancellation capability therein in a wireless communication system is performed by a terminal and includes receiving interference configuration information indicating a first group of cells corresponding to targets for which interference cancellation capability is reflected, and scheduling information of a serving cell, from the serving cell, receiving a specific sequence transmitted from a second group of cells, determining whether to reflect the interference cancellation capability for the first group of cells and the second group of cells, using the interference configuration information, the scheduling information or the specific sequence, and transmitting CSI having reflected the interference cancellation capability therein, wherein the second group of cells correspond to candidate cells capable of reflecting the interference cancellation capability other than the indicated cells.

Additionally or alternatively, the specific sequence may indicate that the second group of cells perform restricted scheduling for a specific period of time.

Additionally or alternatively, the first group of cells may be indicated by physical cell identifiers (PCIs) or reference signal information, and the reference signal information may include a sequence of reference signal, the number of transmission antenna port or a resource element (RE) mapping pattern.

Additionally or alternatively, the interference configuration information may include information about characteristics of interference signals transmitted from the first group of cells, and the information about the characteristics of the interference signals may include information about modulation order, the number of layers or precoding.

Additionally or alternatively, the scheduling information of the serving cell may include information about a delay for processing the CSI and a scheduling period based on the CSI at a specific timing, and the specific timing may be pre-configured or configured through higher layer signaling.

Additionally or alternatively, if the specific period of time overlaps with the scheduling period based on the CSI, the interference cancellation capability may be determined to be reflected for the second group of cells.

In another aspect of the present invention, a terminal configured to report channel state information (CSI) in a wireless communication system includes a radio frequency (RF) unit, and a processor configured to control the RF unit, wherein the processor is further configured to receive interference configuration information indicating a first group of cells corresponding to targets for which interference cancellation capability is reflected, and scheduling information of a serving cell, from the serving cell, receive a specific sequence transmitted from a second group of cells, determine whether to reflect the interference cancellation capability for the first group of cells and the second group of cells, using the interference configuration information, the scheduling information or the specific sequence, and transmit CSI having reflected the interference cancellation capability therein, and wherein the second group of cells correspond to candidate cells capable of reflecting the interference cancellation capability other than the indicated cells.

Additionally or alternatively, the specific sequence may indicate that the second group of cells perform restricted scheduling for a specific period of time.

Additionally or alternatively, the first group of cells may be indicated by physical cell identifiers (PCIs) or reference signal information, and the reference signal information may include a sequence of reference signal, the number of transmission antenna port or a resource element (RE) mapping pattern.

Additionally or alternatively, the interference configuration information may include information about characteristics of interference signals transmitted from the first group of cells, and the information about the characteristics of the interference signals may include information about modulation order, the number of layers or precoding.

Additionally or alternatively, the scheduling information of the serving cell may include information about a delay for processing the CSI and a scheduling period based on the CSI at a specific timing, and the specific timing may be pre-configured or configured through higher layer signaling.

Additionally or alternatively, if the specific period of time overlaps with the scheduling period based on the CSI, the interference cancellation capability may be determined to be reflected for the second group of cells.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Figure 1:
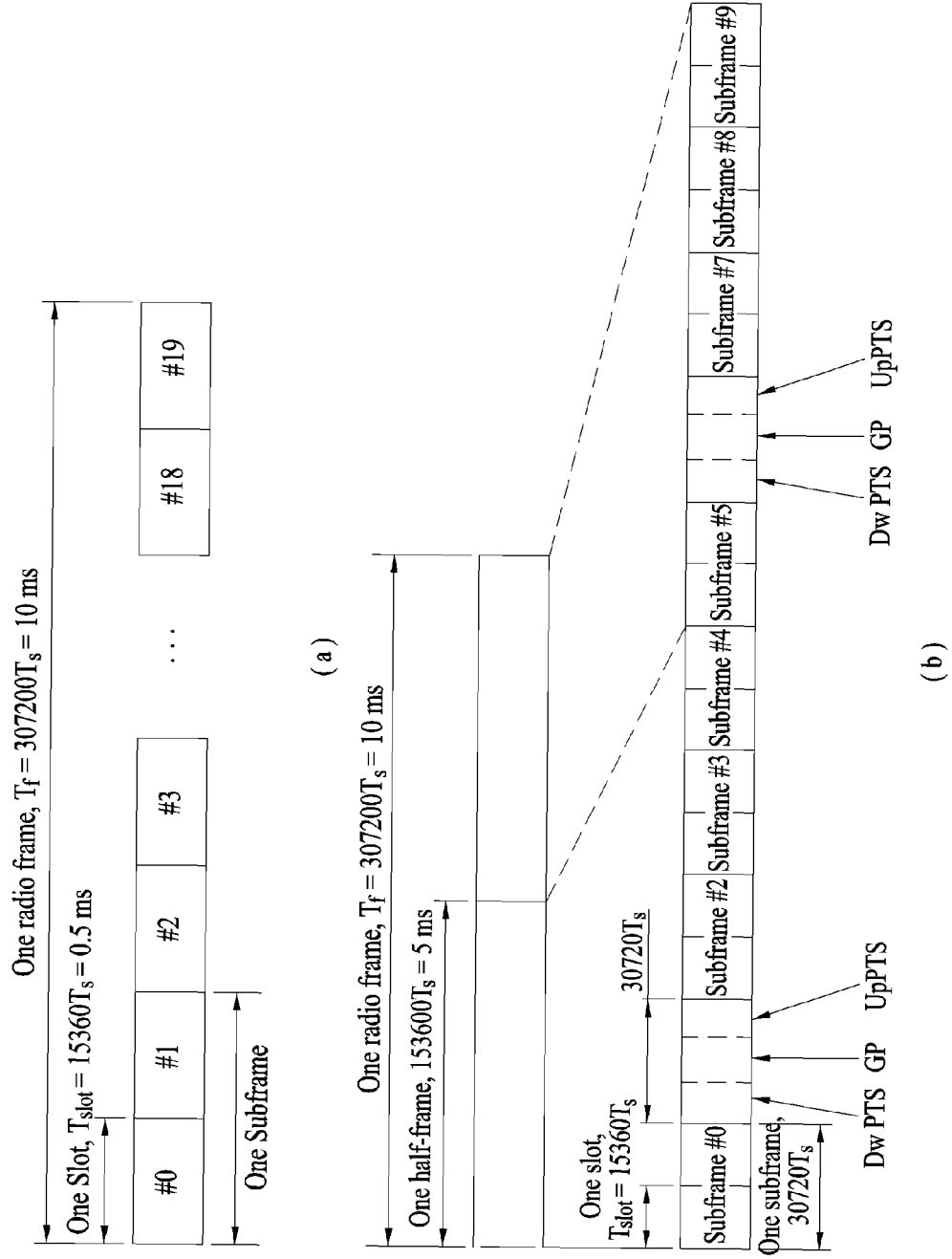
FIG. 1 illustrates an exemplary radio frame structure in a wireless communication system.

Reference will now be made in detail to the preferred embodiments of the present invention, examples of which are illustrated in the accompanying drawings. The accompanying drawings illustrate exemplary embodiments of the present invention and provide a more detailed description of the present invention. However, the scope of the present invention should not be limited thereto.

In some cases, to prevent the concept of the present invention from being ambiguous, structures and apparatuses of the known art will be omitted, or will be shown in the form of a block diagram based on main functions of each structure and apparatus. Also, wherever possible, the same reference numbers will be used throughout the drawings and the specification to refer to the same or like parts.

In the present invention, a user equipment (UE) is fixed or mobile. The UE is a device that transmits and receives user data and/or control information by communicating with a base station (BS). The term 'UE' may be replaced with 'terminal equipment', 'Mobile Station (MS)', 'Mobile Terminal (MT)', 'User Terminal (UT)', 'Subscriber Station (SS)', 'wireless device', 'Personal Digital Assistant (PDA)', 'wireless modem', 'handheld device', etc. A BS is typically a fixed station that communicates with a UE and/or another BS. The BS exchanges data and control information with a UE and another BS. The term 'BS' may be replaced with 'Advanced Base Station (ABS)', 'Node B', 'evolved-Node B (eNB)', 'Base Transceiver System (BTS)', 'Access Point (AP)', 'Processing Server (PS)', etc. In the following description, BS is commonly called eNB.

In the present invention, a node refers to a fixed point capable of transmitting/receiving a radio signal to/from a UE by communication with the UE. Various eNBs can be used as nodes. For example, a node can be a BS, NB, eNB, pico-cell eNB (PeNB), home eNB (HeNB), relay, repeater, etc. Furthermore, a node may not be an eNB. For example, a node can be a radio remote head (RRH) or a radio remote unit (RRU). The RRH and RRU have power levels lower than that of the eNB. Since the RRH or RRU (referred to as RRH/RRU hereinafter) is connected to an eNB through a dedicated line such as an optical cable in general, cooperative communication according to RRH/RRU and eNB can be smoothly performed compared to cooperative communication according to eNBs connected through a wireless link. At least one antenna is installed per node. An antenna may refer to an antenna port, a virtual antenna or an antenna group. A node may also be called a point. Unlink a conventional centralized antenna system (CAS) (i.e. single node system) in which antennas are concentrated in an eNB and controlled an eNB controller, plural nodes are spaced apart at a predetermined distance or longer in a multi-node system. The plural nodes can be managed by one or more eNBs or eNB controllers that control operations of the nodes or schedule data to be transmitted/received through the nodes. Each node may be connected to an eNB or eNB controller managing the corresponding node via a cable or a dedicated line. In the multi-node system, the same cell identity (ID) or different cell IDs may be used for signal transmission/reception through plural nodes. When plural nodes have the same cell ID, each of the plural nodes operates as an antenna group of a cell. If nodes have different cell IDs in the multi-node system, the multi-node system can be regarded as a multi-cell (e.g., macro-cell/femto-cell/pico-cell) system. When multiple cells respectively configured by plural nodes are overlaid according to coverage, a network configured by multiple cells is called a multi-tier network. The cell ID of the RRH/RRU may be identical to or different from the cell ID of an eNB. When the RRH/RRU and eNB use different cell IDs, both the RRH/RRU and eNB operate as independent eNBs.

A communication scheme through which signals are transmitted/received via plural transmit (Tx)/receive (Rx) nodes, signals are transmitted/received via at least one node selected from plural Tx/Rx nodes, or a node transmitting a downlink signal is discriminated from a node transmitting an uplink signal is called multi-eNB MIMO or CoMP (Coordinated Multi-Point Tx/Rx). Coordinated transmission schemes from among CoMP communication schemes can be categorized into JP (Joint Processing) and scheduling coordination. The former may be divided into JT (Joint Transmission)/JR (Joint Reception) and DPS (Dynamic Point Selection) and the latter may be divided into CS (Coordinated Scheduling) and CB (Coordinated Beamforming) DPS may be called DCS (Dynamic Cell Selection). When JP is performed, more various communication environments can be generated, compared to other CoMP schemes. JT refers to a communication scheme by which plural nodes transmit the same stream to a UE and JR refers to a communication scheme by which plural nodes receive the same stream from the UE. The UE/eNB combine signals received from the plural nodes to restore the stream. In the case of JT/JR, signal transmission reliability can be improved according to transmit diversity since the same stream is transmitted from/to plural nodes. DPS refers to a communication scheme by which a signal is transmitted/received through a node selected from plural nodes according to a specific rule. In the case of DPS, signal transmission reliability can be improved because a node having a good channel state between the node and a UE is selected as a communication node.

In the present invention, a cell refers to a specific geographical area in which one or more nodes provide communication services. Accordingly, communication with a specific cell may mean communication with an eNB or a node providing communication services to the specific cell. A downlink/uplink signal of a specific cell refers to a downlink/uplink signal from/to an eNB or a node providing communication services to the specific cell. A cell providing uplink/downlink communication services to a UE is called a serving cell. Furthermore, channel status/quality of a specific cell refers to channel status/quality of a channel or a communication link generated between an eNB or a node providing communication services to the specific cell and a UE. In 3GPP LTE-A systems, a UE can measure downlink channel state from a specific node using one or more CSI-RSs (Channel State Information Reference Signals) transmitted through antenna port(s) of the specific node on a CSI-RS resource allocated to the specific node. In general, neighboring nodes transmit CSI-RS resources on orthogonal CSI-RS resources. When CSI-RS resources are orthogonal, this means that the CSI-RS resources have different subframe configurations and/or CSI-RS sequences which specify subframes to which CSI-RSs are allocated according to CSI-RS resource configurations, subframe offsets and transmission periods, etc. which specify symbols and subcarriers carrying the CSI RSs.

In the present invention, PDCCH (Physical Downlink Control Channel)/PCFICH (Physical Control Format Indicator Channel)/PHICH (Physical Hybrid automatic repeat request Indicator Channel)/PDSCH (Physical Downlink Shared Channel) refer to a set of time-frequency resources or resource elements respectively carrying DCI (Downlink Control Information)/CFI (Control Format Indicator)/downlink ACK/NACK (Acknowledgement/Negative ACK)/downlink data. In addition, PUCCH (Physical Uplink Control Channel)/PUSCH (Physical Uplink Shared Channel)/PRACH (Physical Random Access Channel) refer to sets of time-frequency resources or resource elements respectively carrying UCI (Uplink Control Information)/uplink data/random access signals. In the present invention, a time-frequency resource or a resource element (RE), which is allocated to or belongs to PDCCH/PCFICH/PHICH/PDSCH/PUCCH/PUSCH/PRACH, is referred to as a PDCCH/PCFICH/PHICH/PDSCH/PUCCH/PUSCH/PRACH RE or PDCCH/PCFICH/PHICH/PDSCH/PUCCH/PUSCH/PRACH resource. In the following description, transmission of PUCCH/PUSCH/PRACH by a UE is equivalent to transmission of uplink control information/uplink data/random access signal through or on PUCCH/PUSCH/PRACH. Furthermore, transmission of PDCCH/PCFICH/PHICH/PDSCH by an eNB is equivalent to transmission of downlink data/control information through or on PDCCH/PCFICH/PHICH/PDSCH.

FIG. 1 illustrates an exemplary radio frame structure used in a wireless communication system. FIG. 1(a) illustrates a frame structure for frequency division duplex (FDD) used in 3GPP LTE/LTE-A and FIG. 1(b) illustrates a frame structure for time division duplex (TDD) used in 3GPP LTE/LTE-A.

Referring to FIG. 1, a radio frame used in 3GPP LTE/LTE-A has a length of 10 ms (307200 Ts) and includes 10 subframes in equal size. The 10 subframes in the radio frame may be numbered. Here, Ts denotes sampling time and is represented as Ts=1/(2048*15 kHz). Each subframe has a length of 1 ms and includes two slots. 20 slots in the radio frame can be sequentially numbered from 0 to 19. Each slot has a length of 0.5 ms. A time for transmitting a subframe is defined as a transmission time interval (TTI). Time resources can be discriminated by a radio frame number (or radio frame index), subframe number (or subframe index) and a slot number (or slot index).

The radio frame can be configured differently according to duplex mode. Downlink transmission is discriminated from uplink transmission by frequency in FDD mode, and thus the radio frame includes only one of a downlink subframe and an uplink subframe in a specific frequency band. In TDD mode, downlink transmission is discriminated from uplink transmission by time, and thus the radio frame includes both a downlink subframe and an uplink subframe in a specific frequency band.

Table 1 shows DL-UL configurations of subframes in a radio frame in the TDD mode.

TABLE 1

| DL-UL config-uration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In Table 1, D denotes a downlink subframe, U denotes an uplink subframe and S denotes a special subframe. The special subframe includes three fields of DwPTS (Downlink Pilot TimeSlot), GP (Guard Period), and UpPTS (Uplink Pilot TimeSlot). DwPTS is a period reserved for downlink transmission and UpPTS is a period reserved for uplink transmission. Table 2 shows special subframe configuration.

the time domain and a plurality of resource blocks (RBs) in the frequency domain. An OFDM symbol may refer to a symbol period. A signal transmitted in each slot may be represented by a resource grid composed of $N_{RB}^{DL/UL} * N_{sc}^{RB}$ subcarriers and $N_{symb}^{DL/UL}$ OFDM symbols. Here, $N_{RB}^{DL}$ denotes the number of RBs in a downlink slot and $N_{RB}^{UL}$ denotes the number of RBs in an uplink slot. $N_{RB}^{DL}$ and $N_{RB}^{UL}$ respectively depend on a DL transmission bandwidth and a UL transmission bandwidth. $N_{symb}^{DL}$ denotes the number of OFDM symbols in the downlink slot and $N_{symb}^{UL}$ denotes the number of OFDM symbols in the uplink slot. In addition, $N_{sc}^{RB}$ denotes the number of subcarriers constructing one RB.

Figure 2:
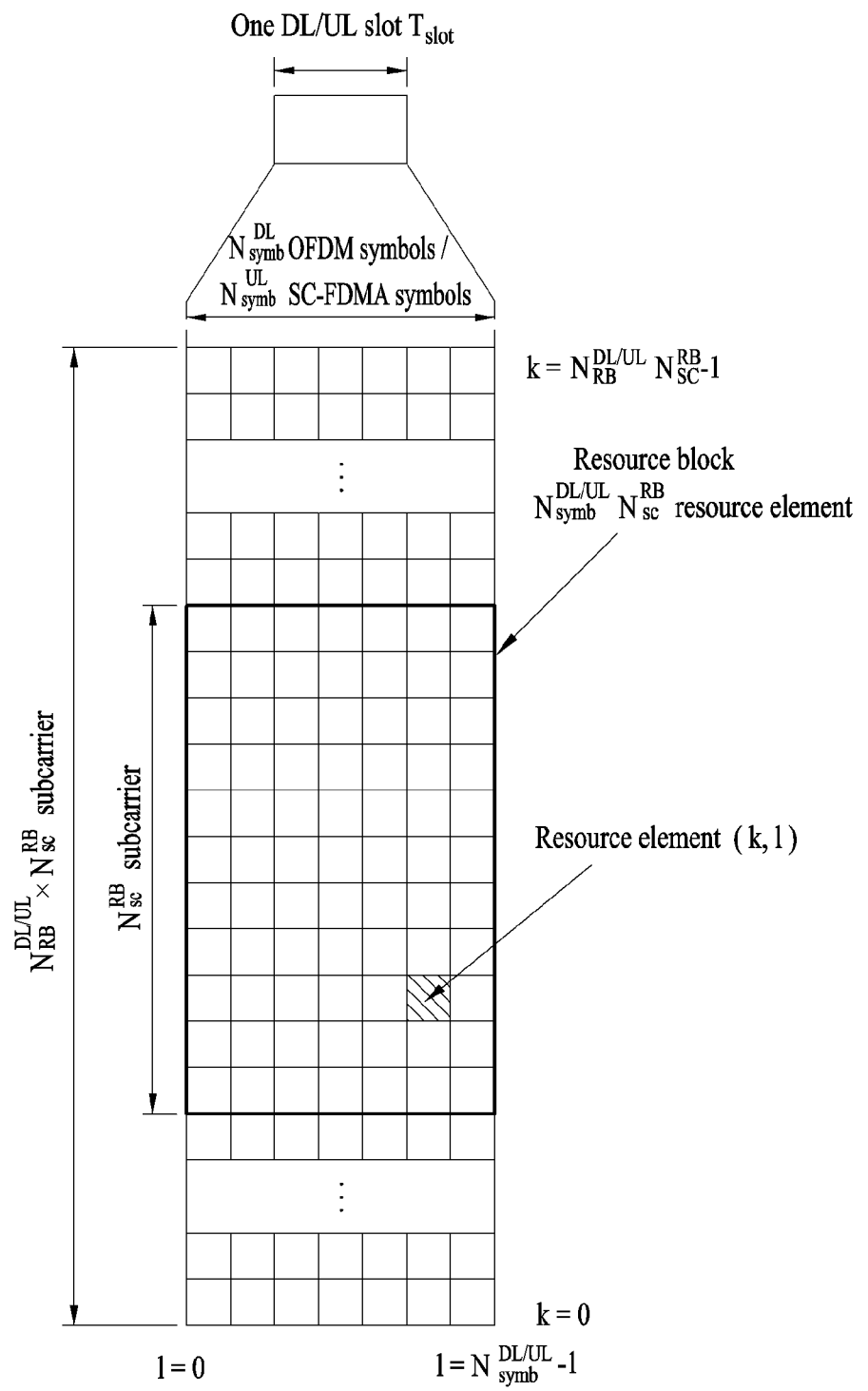
FIG. 2 illustrates an exemplary structure of a downlink/uplink (DL/UL) slot in a wireless communication system.

An OFDM symbol may be called an SC-FDM (Single Carrier Frequency Division Multiplexing) symbol according to multiple access scheme. The number of OFDM symbols included in a slot may depend on a channel bandwidth and the length of a cyclic prefix (CP). For example, a slot includes 7 OFDM symbols in the case of normal CP and 6 OFDM symbols in the case of extended CP. While FIG. 2 illustrates a subframe in which a slot includes 7 OFDM symbols for convenience, embodiments of the present invention can be equally applied to subframes having different numbers of OFDM symbols. Referring to FIG. 2, each OFDM symbol includes $N_{RB}^{DL/UL} * N_{sc}^{RB}$ subcarriers in the frequency domain. Subcarrier types can be classified into a data subcarrier for data transmission, a reference signal subcarrier for reference signal transmission, and null subcarriers for a guard band and a direct current (DC) component. The null subcarrier for a DC component is a subcarrier remaining unused and is mapped to a carrier frequency (f0) during OFDM signal generation or frequency up-conversion. The carrier frequency is also called a center frequency.

An RB is defined by $N_{symb}^{DL/UL}$ (e.g., 7) consecutive OFDM symbols in the time domain and $N_{sc}^{RB}$ (e.g., 12) consecutive subcarriers in the frequency domain. For reference, a resource composed by an OFDM symbol and a subcarrier is called a resource element (RE) or a tone. Accordingly, an RB is composed of $N_{symb}^{DL/UL} * N_{sc}^{RB}$ REs. Each RE in a resource grid can be uniquely defined by an index pair (k, 1) in a slot. Here, k is an index in the range

TABLE 2

| | | Normal cyclic prefix in downlink | | | Extended cyclic prefix in downlink | | |
|---|---|---|---|---|---|---|---|
| | | | UpPTS | | | UpPTS | |
| Special subframe configuration | DwPTS | | Normal cyclic prefix in uplink | Extended cyclic prefix in uplink | DwPTS | Normal cyclic prefix in uplink | Extended cyclic prefix in uplink |
| 0 | 6592 · $T_s$ | | 2192 · $T_s$ | 2560 · $T_s$ | 7680 · $T_s$ | 2192 · $T_s$ | 2560 · $T_s$ |
| 1 | 19760 · $T_s$ | | | | 20480 · $T_s$ | | |
| 2 | 21952 · $T_s$ | | | | 23040 · $T_s$ | | |
| 3 | 24144 · $T_s$ | | | | 25600 · $T_s$ | | |
| 4 | 26336 · $T_s$ | | | | 7680 · $T_s$ | 4384 · $T_s$ | 5120 · $T_s$ |
| 5 | 6592 · $T_s$ | | 4384 · $T_s$ | 5120 · $T_s$ | 20480 · $T_s$ | | |
| 6 | 19760 · $T_s$ | | | | 23040 · $T_s$ | | |
| 7 | 21952 · $T_s$ | | | | 12800 · $T_s$ | | |
| 8 | 24144 · $T_s$ | | | | — | — | — |
| 9 | 13168 · $T_s$ | | | | — | — | — |

FIG. 2 illustrates an exemplary downlink/uplink slot structure in a wireless communication system. Particularly, FIG. 2 illustrates a resource grid structure in 3GPP LTE/LTE-A. A resource grid is present per antenna port.

Referring to FIG. 2, a slot includes a plurality of OFDM (Orthogonal Frequency Division Multiplexing) symbols in of 0 to $N_{symb}^{DL/UL} * N_{sc}^{RB} - 1$ in the frequency domain and 1 is an index in the range of 0 to $N_{symb}^{DL/UL} - 1$.

Two RBs that occupy $N_{sc}^{RB}$ consecutive subcarriers in a subframe and respectively disposed in two slots of the subframe are called a physical resource block (PRB) pair. Two RBs constituting a PRB pair have the same PRB number (or PRB index). A virtual resource block (VRB) is a logical resource allocation unit for resource allocation. The VRB has the same size as that of the PRB. The VRB may be divided into a localized VRB and a distributed VRB depending on a mapping scheme of VRB into PRB. The localized VRBs are mapped into the PRBs, whereby VRB number (VRB index) corresponds to PRB number. That is, nPRB=nVRB is obtained. Numbers are given to the localized VRBs from 0 to $N_{VRB}^{DL}-1$, and $N_{VRB}^{DL}=N_{RB}^{DL}$ is obtained. Accordingly, according to the localized mapping scheme, the VRBs having the same VRB number are mapped into the PRBs having the same PRB number at the first slot and the second slot. On the other hand, the distributed VRBs are mapped into the PRBs through interleaving. Accordingly, the VRBs having the same VRB number may be mapped into the PRBs having different PRB numbers at the first slot and the second slot. Two PRBs, which are respectively located at two slots of the subframe and have the same VRB number, will be referred to as a pair of VRBs.

Figure 3:
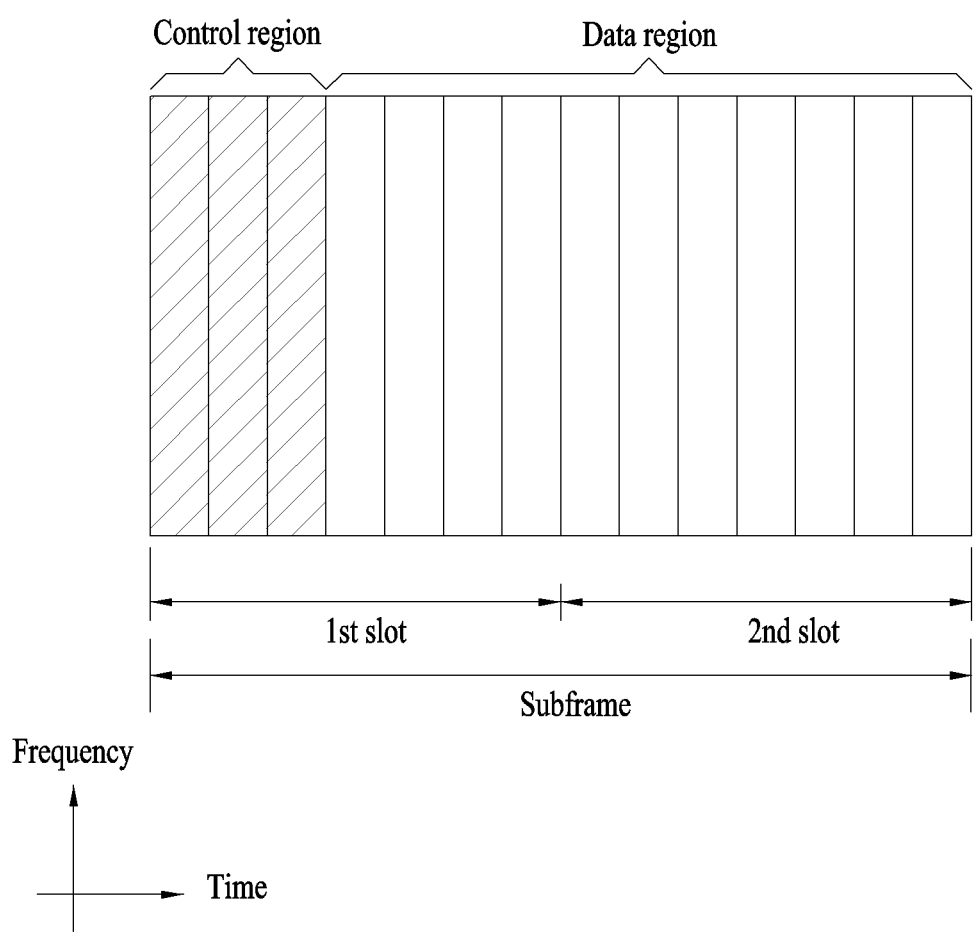
FIG. 3 illustrates an exemplary structure of a DL subframe in a $3^{rd}$ Generation Partnership project (3GPP) Long Term Evolution (LTE)/LTE-Advanced (LTE-A) system.

FIG. 3 illustrates a downlink (DL) subframe structure used in 3GPP LTE/LTE-A.

Referring to FIG. 3, a DL subframe is divided into a control region and a data region. A maximum of three (four) OFDM symbols located in a front portion of a first slot within a subframe correspond to the control region to which a control channel is allocated. A resource region available for PDCCH transmission in the DL subframe is referred to as a PDCCH region hereinafter. The remaining OFDM symbols correspond to the data region to which a physical downlink shared chancel (PDSCH) is allocated. A resource region available for PDSCH transmission in the DL subframe is referred to as a PDSCH region hereinafter. Examples of downlink control channels used in 3GPP LTE include a physical control format indicator channel (PCFICH), a physical downlink control channel (PDCCH), a physical hybrid ARQ indicator channel (PHICH), etc. The PCFICH is transmitted at a first OFDM symbol of a subframe and carries information regarding the number of OFDM symbols used for transmission of control channels within the subframe. The PHICH is a response of uplink transmission and carries an HARQ acknowledgment (ACK)/negative acknowledgment (NACK) signal.

Control information carried on the PDCCH is called downlink control information (DCI). The DCI contains resource allocation information and control information for a UE or a UE group. For example, the DCI includes a transport format and resource allocation information of a downlink shared channel (DL-SCH), a transport format and resource allocation information of an uplink shared channel (UL-SCH), paging information of a paging channel (PCH), system information on the DL-SCH, information about resource allocation of an upper layer control message such as a random access response transmitted on the PDSCH, a transmit control command set with respect to individual UEs in a UE group, a transmit power control command, information on activation of a voice over IP (VoIP), downlink assignment index (DAI), etc. The transport format and resource allocation information of the DL-SCH are also called DL scheduling information or a DL grant and the transport format and resource allocation information of the UL-SCH are also called UL scheduling information or a UL grant. The size and purpose of DCI carried on a PDCCH depend on DCI format and the size thereof may be varied according to coding rate. Various formats, for example, formats 0 and 4 for uplink and formats 1, 1A, 1B, 1C, 1D, 2, 2A, 2B, 2C, 3 and 3A for downlink, have been defined in 3GPP LTE. Control information such as a hopping flag, information on RB allocation, modulation coding scheme (MCS), redundancy version (RV), new data indicator (NDI), information on transmit power control (TPC), cyclic shift demodulation reference signal (DMRS), UL index, channel quality information (CQI) request, DL assignment index, HARQ process number, transmitted precoding matrix indicator (TPMI), precoding matrix indicator (PMI), etc. is selected and combined based on DCI format and transmitted to a UE as DCI.

In general, a DCI format for a UE depends on transmission mode (TM) set for the UE. In other words, only a DCI format corresponding to a specific TM can be used for a UE configured in the specific TM.

A PDCCH is transmitted on an aggregation of one or several consecutive control channel elements (CCEs). The CCE is a logical allocation unit used to provide the PDCCH with a coding rate based on a state of a radio channel. The CCE corresponds to a plurality of resource element groups (REGs). For example, a CCE corresponds to 9 REGs and an REG corresponds to 4 REs. 3GPP LTE defines a CCE set in which a PDCCH can be located for each UE. A CCE set from which a UE can detect a PDCCH thereof is called a PDCCH search space, simply, search space. An individual resource through which the PDCCH can be transmitted within the search space is called a PDCCH candidate. A set of PDCCH candidates to be monitored by the UE is defined as the search space. In 3GPP LTE/LTE-A, search spaces for DCI formats may have different sizes and include a dedicated search space and a common search space. The dedicated search space is a UE-specific search space and is configured for each UE. The common search space is configured for a plurality of UEs. Aggregation levels defining the search space is as follows.

TABLE 3

| | Search Space | | |
|---|---|---|---|
| Type | Aggregation Level L | Size [in CCEs] | Number of PDCCH candidates $M^{(L)}$ |
| UE-specific | 1 | 6 | 6 |
| | 2 | 12 | 6 |
| | 4 | 8 | 2 |
| | 8 | 16 | 2 |
| Common | 4 | 16 | 4 |
| | 8 | 16 | 2 |

A PDCCH candidate corresponds to 1, 2, 4 or 8 CCEs according to CCE aggregation level. An eNB transmits a PDCCH (DCI) on an arbitrary PDCCH candidate with in a search space and a UE monitors the search space to detect the PDCCH (DCI). Here, monitoring refers to attempting to decode each PDCCH in the corresponding search space according to all monitored DCI formats. The UE can detect the PDCCH thereof by monitoring plural PDCCHs. Since the UE does not know the position in which the PDCCH thereof is transmitted, the UE attempts to decode all PDCCHs of the corresponding DCI format for each subframe until a PDCCH having the ID thereof is detected. This process is called blind detection (or blind decoding (BD)).

The eNB can transmit data for a UE or a UE group through the data region. Data transmitted through the data region may be called user data. For transmission of the user data, a physical downlink shared channel (PDSCH) may be allocated to the data region. A paging channel (PCH) and downlink-shared channel (DL-SCH) are transmitted through the PDSCH. The UE can read data transmitted through the PDSCH by decoding control information transmitted through a PDCCH. Information representing a UE or a UE group to which data on the PDSCH is transmitted, how the UE or UE group receives and decodes the PDSCH data, etc. is included in the PDCCH and transmitted. For example, if a specific PDCCH is CRC (cyclic redundancy check)-masked having radio network temporary identify (RNTI) of "A" and information about data transmitted using a radio resource (e.g., frequency position) of "B" and transmission format information (e.g., transport block size, modulation scheme, coding information, etc.) of "C" is transmitted through a specific DL subframe, the UE monitors PDCCHs using RNTI information and a UE having the RNTI of "A" detects a PDCCH and receives a PDSCH indicated by "B" and "C" using information about the PDCCH.

A reference signal (RS) to be compared with a data signal is necessary for the UE to demodulate a signal received from the eNB. A reference signal refers to a predetermined signal having a specific waveform, which is transmitted from the eNB to the UE or from the UE to the eNB and known to both the eNB and UE. The reference signal is also called a pilot. Reference signals are categorized into a cell-specific RS shared by all UEs in a cell and a modulation RS (DM RS) dedicated for a specific UE. A DM RS transmitted by the eNB for demodulation of downlink data for a specific UE is called a UE-specific RS. Both or one of DM RS and CRS may be transmitted on downlink. When only the DM RS is transmitted without CRS, an RS for channel measurement needs to be additionally provided because the DM RS transmitted using the same precoder as used for data can be used for demodulation only. For example, in 3GPP LTE(-A), CSI-RS corresponding to an additional RS for measurement is transmitted to the UE such that the UE can measure channel state information. CSI-RS is transmitted in each transmission period corresponding to a plurality of subframes based on the fact that channel state variation with time is not large, unlike CRS transmitted per subframe.

Figure 4:
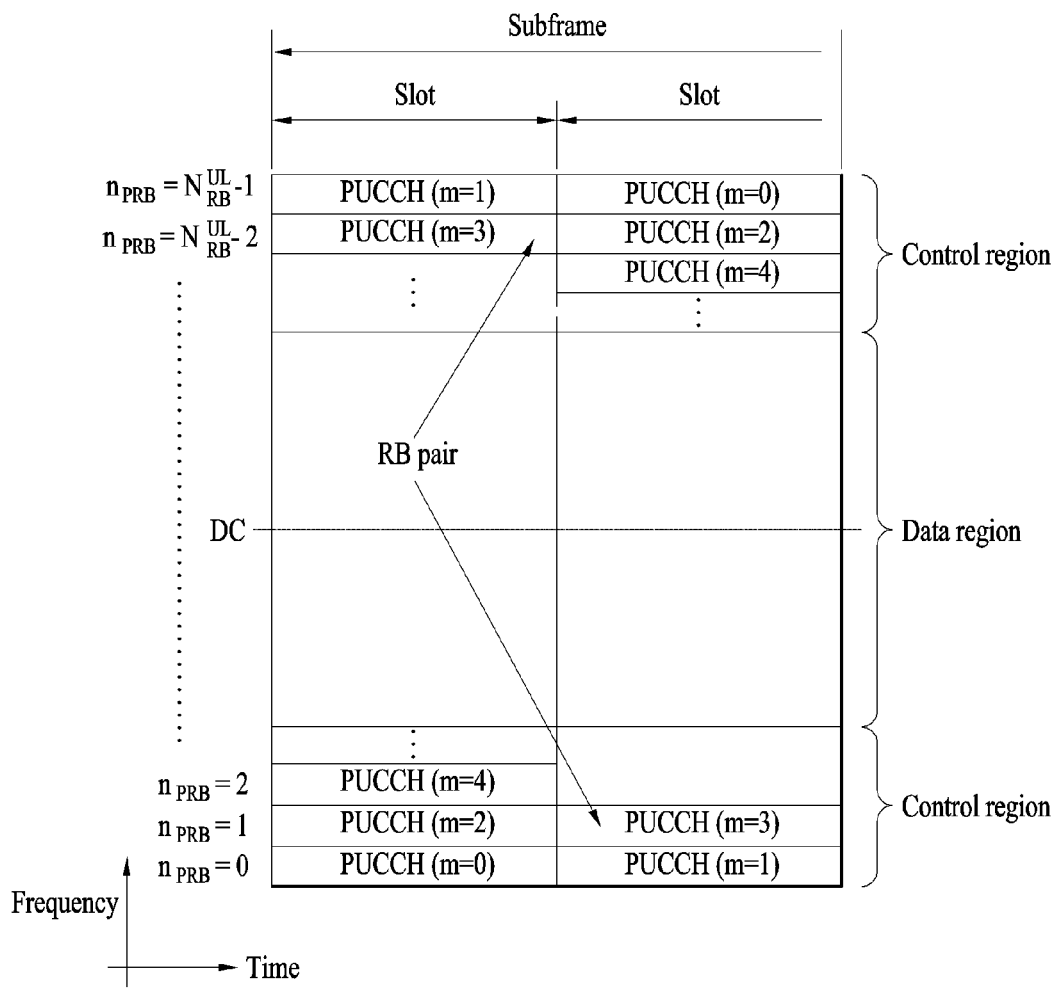
FIG. 4 illustrates an exemplary structure of a UL subframe in the 3GPP LTE/LTE-A system.

FIG. 4 illustrates an exemplary uplink subframe structure used in 3GPP LTE/LTE-A.

Referring to FIG. 4, a UL subframe can be divided into a control region and a data region in the frequency domain. One or more PUCCHs (physical uplink control channels) can be allocated to the control region to carry uplink control information (UCI). One or more PUSCHs (Physical uplink shared channels) may be allocated to the data region of the UL subframe to carry user data.

In the UL subframe, subcarriers spaced apart from a DC subcarrier are used as the control region. In other words, subcarriers corresponding to both ends of a UL transmission bandwidth are assigned to UCI transmission. The DC subcarrier is a component remaining unused for signal transmission and is mapped to the carrier frequency f0 during frequency up-conversion. A PUCCH for a UE is allocated to an RB pair belonging to resources operating at a carrier frequency and RBs belonging to the RB pair occupy different subcarriers in two slots. Assignment of the PUCCH in this manner is represented as frequency hopping of an RB pair allocated to the PUCCH at a slot boundary. When frequency hopping is not applied, the RB pair occupies the same subcarrier.

The PUCCH can be used to transmit the following control information.

Scheduling Request (SR): This is information used to request a UL-SCH resource and is transmitted using On-Off Keying (OOK) scheme.

HARQ ACK/NACK: This is a response signal to a downlink data packet on a PDSCH and indicates whether the downlink data packet has been successfully received. A 1-bit ACK/NACK signal is transmitted as a response to a single downlink codeword and a 2-bit ACK/NACK signal is transmitted as a response to two downlink codewords. HARQ-ACK responses include positive ACK (ACK), negative ACK (NACK), discontinuous transmission (DTX) and NACK/DTX. Here, the term HARQ-ACK is used interchangeably with the term HARQ ACK/NACK and ACK/NACK.

Channel State Indicator (CSI): This is feedback information about a downlink channel. Feedback information regarding MIMO includes a rank indicator (RI) and a precoding matrix indicator (PMI).

The quantity of control information (UCI) that a UE can transmit through a subframe depends on the number of SC-FDMA symbols available for control information transmission. The SC-FDMA symbols available for control information transmission correspond to SC-FDMA symbols other than SC-FDMA symbols of the subframe, which are used for reference signal transmission. In the case of a subframe in which a sounding reference signal (SRS) is configured, the last SC-FDMA symbol of the subframe is excluded from the SC-FDMA symbols available for control information transmission. A reference signal is used to detect coherence of the PUCCH. The PUCCH supports various formats according to information transmitted thereon. Table 4 shows the mapping relationship between PUCCH formats and UCI in LTE/LTE-A.

TABLE 4

| PUCCH format | Modulation scheme | Number of bits per subframe, $M_{bit}$ | Usage | Etc. |
| --- | --- | --- | --- | --- |
| 1 | N/A | N/A | SR (Scheduling Request) | |
| 1a | BPSK | 1 | ACK/NACK or SR + ACK/NACK | One codeword |
| 1b | QPSK | 2 | ACK/NACK or SR + ACK/NACK | Two codeword |
| 2 | QPSK | 20 | CQI/PMI/RI | Joint coding ACK/NACK (extended CP) |
| 2a | QPSK + BPSK | 21 | CQI/PMI/RI + ACK/NACK | Normal CP only |
| 2b | QPSK + QPSK | 22 | CQI/PMI/RI + ACK/NACK | Normal CP only |
| 3 | QPSK | 48 | ACK/NACK or SR + ACK/NACK or CQI/PMI/RI + ACK/NACK | |

Referring to Table 4, PUCCH formats 1/1a/1b are used to transmit ACK/NACK information, PUCCH format 2/2a/2b are used to carry CSI such as CQI/PMI/RI and PUCCH format 3 is used to transmit ACK/NACK information.

Reference Signal (RS)

When a packet is transmitted in a wireless communication system, signal distortion may occur during transmission since the packet is transmitted through a radio channel. To correctly receive a distorted signal at a receiver, the distorted signal needs to be corrected using channel information. To detect channel information, a signal known to both a transmitter and the receiver is transmitted and channel information is detected with a degree of distortion of the signal when the signal is received through a channel. This signal is called a pilot signal or a reference signal.

When data is transmitted/received using multiple antennas, the receiver can receive a correct signal only when the receiver is aware of a channel state between each transmit antenna and each receive antenna. Accordingly, a reference signal needs to be provided per transmit antenna, more specifically, per antenna port.

Reference signals can be classified into an uplink reference signal and a downlink reference signal. In LTE, the uplink reference signal includes:

i) a demodulation reference signal (DMRS) for channel estimation for coherent demodulation of information transmitted through a PUSCH and a PUCCH; and ii) a sounding reference signal (SRS) used for an eNB to measure uplink channel quality at a frequency of a different network.

The downlink reference signal includes:

i) a cell-specific reference signal (CRS) shared by all UEs in a cell;

ii) a UE-specific reference signal for a specific UE only;

iii) a DMRS transmitted for coherent demodulation when a PDSCH is transmitted;

iv) a channel state information reference signal (CSI-RS) for delivering channel state information (CSI) when a downlink DMRS is transmitted;

v) a multimedia broadcast single frequency network (MBSFN) reference signal transmitted for coherent demodulation of a signal transmitted in MBSFN mode; and vi) a positioning reference signal used to estimate geographic position information of a UE.

Reference signals can be classified into a reference signal for channel information acquisition and a reference signal for data demodulation. The former needs to be transmitted in a wide band as it is used for a UE to acquire channel information on downlink transmission and received by a UE even if the UE does not receive downlink data in a specific subframe. This reference signal is used even in a handover situation. The latter is transmitted along with a corresponding resource by an eNB when the eNB transmits a downlink signal and is used for a UE to demodulate data through channel measurement. This reference signal needs to be transmitted in a region in which data is transmitted.

CoMP (Coordinated Multiple Point Transmission and Reception)

In accordance with the improved system throughput requirements of the 3GPP LTE-A system, CoMP transmission/reception technology (also referred to as Co-MIMO, collaborative MIMO or network MIMO) has recently been proposed. The CoMP technology can increase throughput of a UE located at a cell edge and also increase average sector throughput.

In general, in a multi-cell environment in which a frequency reuse factor is 1, the performance of the UE located on the cell edge and average sector throughput may be reduced due to Inter-Cell Interference (ICI). In order to reduce the ICI, in the legacy LTE system, a method of enabling the UE located at the cell edge to have appropriate throughput and performance using a simple passive method such as Fractional Frequency Reuse (FFR) through the UE-specific power control in the environment restricted by interference is applied. However, rather than decreasing the use of frequency resources per cell, it is preferable that the ICI is reduced or the UE reuses the ICI as a desired signal. In order to accomplish the above object, a CoMP transmission scheme may be applied.

The CoMP scheme applicable to the downlink may be largely classified into a Joint Processing (JP) scheme and a Coordinated Scheduling/Beamforming (CS/CB) scheme.

In the JP scheme, each point (eNB) of a CoMP unit may use data. The CoMP unit refers to a set of eNBs used in the CoMP scheme. The JP scheme may be classified into a joint transmission scheme and a dynamic cell selection scheme.

The joint transmission scheme refers to a scheme for transmitting a PDSCH from a plurality of points (a part or the whole of the CoMP unit). That is, data transmitted to a single UE may be simultaneously transmitted from a plurality of transmission points. According to the joint transmission scheme, it is possible to coherently or non-coherently improve the quality of the received signals and to actively eliminate interference with another UE.

The dynamic cell selection scheme refers to a scheme for transmitting a PDSCH from one point (of the CoMP unit). That is, data transmitted to a single UE at a specific time is transmitted from one point and the other points in the cooperative unit at that time do not transmit data to the UE. The point for transmitting the data to the UE may be dynamically selected.

According to the CS/CB scheme, the CoMP units may cooperatively perform beamforming of data transmission to a single UE. Although only a serving cell transmits the data, user scheduling/beamforming may be determined by coordination of the cells of the CoMP unit.

In uplink, coordinated multi-point reception refers to reception of a signal transmitted by coordination of a plurality of geographically separated points. The CoMP scheme applicable to the uplink may be classified into Joint Reception (JR) and Coordinated Scheduling/Beamforming (CS/CB).

The JR scheme indicates that a plurality of reception points receives a signal transmitted through a PUSCH, the CS/CB scheme indicates that only one point receives a PUSCH, and user scheduling/beamforming is determined by the coordination of the cells of the CoMP unit.

In addition, one case in which there are multiple UL points (i.e., multiple Rx points) is referred to as UL CoMP, and the other case in which there are multiple DL points (i.e., multiple Tx points) is referred to as DL CoMP.

CSI-RS(Channel State Information-reference Signal)

In 3GPP LTE(-A), the antenna port configured to transmit CSI-RS is referred to as a CSI-RS port, and the position of a resource contained in a predetermined resource region in which CSI-RS port(s) transmit(s) the corresponding CSI-RS(s) is referred to as a CSI-RS pattern or a CSI-RS resource configuration. In addition, time-frequency resources through which CSI-RS is allocated/transmitted are referred to as CSI-RS resources. For example, a resource element (RE) used for CSI-RS transmission is referred to as CSI-RS RE. Unlike CRS in which the RE position at which CRS per antenna port is transmitted is fixed, CSI-RS has a maximum of 32 different constructions so as to reduce inter-cell interference (ICI) under a multi-cell environment including a heterogeneous network environment. Different CSI-RS constructions are made according to the number of antenna ports contained in the cell, and contiguous cells may be configured to have different structures. Unlike CRS, CSI-RS may support a maximum of 8 antenna ports (p=15, p=15, 16, p=15, . . . , 18, and p=15, . . . , 22), and CSI-RS may be defined only for Δ f=15 kHz. The antenna ports (p=15, . . . , 22) may correspond to CSI-RS ports (p=0, . . . , 7), respectively.

CSI-RS configuration may be varies according to the number of CSI-RS ports configured. There are 20 CSI-RS configurations if 2 CSI-RS ports are configured, there are 10 CSI-RS configurations if 4 CSI-RS ports are configured, and there are 5 CSI-RS configurations if 8 CSI-RS ports are configured. Numbers may be assigned to respective CSI-RS configurations defined by the number of CSI-RS ports.

The CSI-RS structures have nested property. The nested property may indicate that a CSI-RS structure for a large number of CSI-RS ports is used as a super set of a CSI-RS structure for a small number of CSI-RS ports. For example, REs configured to construct CSI-RS structure #0 regarding 4 CSI-RS ports are contained in resources configured to construct CSI-RS structure #0 regarding 8 CSI-RS ports.

A plurality of CSI-RSs may be used in a given cell. In the case of non-zero power CSI-RS, only CSI-RS for one structure is transmitted. In the case of zero-power CSI-RS, CSI-RS of a plurality of structures can be transmitted. From among resources corresponding to the zero-power CSI-RS, the UE proposes zero transmit (Tx) power for resources other than resources to be proposed as non-zero power CSI-RS. For example, in the case of a radio frame for TDD, no CSI-RS is transmitted in any one of a special subframe in which DL transmission and UL transmission coexist, a subframe in which a paging message is transmitted, and a subframe in which transmission of a synchronous signal, physical broadcast channel (PBCH) or system information block type 1 (SIB1) collides with CSI-RS. The UE assumes that no CSI-RS is transmitted in the above subframes. Meanwhile, time-frequency resources used by the CSI-RS port for transmission of the corresponding CSI-RS are not used for PDSCH transmission, and are not used for CSI-RS transmission of other antenna ports instead of the corresponding CSI-RS port.

Time-frequency resources used for CSI-RS transmission are not used for data transmission, such that a data throughput is reduced in proportion to the increasing CSI-RS overhead. Considering this fact, CSI-RS is not constructed every subframe, and the CSI-RS is transmitted at intervals of a predetermined transmission period corresponding to a plurality of subframes. In this case, compared to the case in which CSI-RS is transmitted every subframe, the amount of CSI-RS transmission overhead can be greatly reduced. The above-mentioned subframe will hereinafter be referred to as a CSI-RS subframe configured for CSI-RS transmission.

A base station (BS) can inform a UE of the following parameters through higher layer signaling (e.g., MAC signaling, RRC signaling, etc.).

Number of CSI-RS ports
CSI-RS structure
CSI-RS subframe configuration $I_{CSI-RS}$
CSI-RS subframe configuration period $T_{CSI-RS}$
CSI-RS subframe offset $\Delta_{CSI-RS}$ If necessary, the BS (or eNB) may inform the UE of not only a CSI-RS configuration transmitted at zero power, but also a subframe used for transmission of the zero-power CSI-RS configuration.

CSI-IM (Interference Measurement)

For the 3GPP LTE Rel-11 UE, one or more CSI-IM resource structures may be configured. CSI-IM resource may be used to measure interference. The CSI-RS structure and the CSI-RS subframe structure (ICSI-RS) shown in FIG. 5 may be configured through higher layer signaling for each CSI-IM resource.

CSI Report

In a 3GPP LTE(-A) system, a user equipment (UE) reports channel state information (CSI) to a base station (BS) and CSI refers to information indicating quality of a radio channel (or a link) formed between the UE and an antenna port. For example, the CSI includes a rank indicator (RI), a precoding matrix indicator (PMI), a channel quality indicator (CQI), etc. Here, the RI indicates rank information of a channel and means the number of streams received by the UE via the same time-frequency resources. Since the value of the RI is determined depending on long term fading of the channel, the RI is fed from the UE back to the BS with periodicity longer than that of the PMI or the CQI. The PMI has a channel space property and indicates a precoding index preferred by the UE based on a metric such a signal to interference plus noise ratio (SINR). The CQI indicates the strength of the channel and means a reception SINR obtained when the BS uses the PMI.

Based on measurement of the radio channel, the UE may calculate a preferred PMI and RI, which may derive an optimal or best transfer rate when used by the BS, in a current channel state and feed the calculated PMI and RI back to the BS. The CQI refers to a modulation and coding scheme for providing acceptable packet error probability for the fed-back PMI/RI.

A wireless communication system such as LTE receives CSI feedback from a UE to determine a data transmission scheme such as scheduling, precoding or MCS. For example, in LTE Rel-11, an eNB allocates a CSI-reference signal (RS) for data channel measurement and a CSI-interference measurement (IM) resource for interference measurement to UEs for CSI feedback. In this case, a combination of a single CSI-RS and a single CSI-IM resource may be defined as a CSI process. The UE having received allocation of the CSI process measures spatial characteristics and reception intensity of a received signal based on the CSI-RS, measures spatial characteristics and interference intensity of an interference signal based on the CSI-IM resource, determines a rank indicator (RI), a precoding matrix indicator (PMI) and a channel quality indicator (CQI) of the corresponding CSI process, and reports the determined information to the eNB. In LTE Rel-11, the UE can receive allocation of a plurality of CSI processes to receive data transmitted from a plurality of cells according to a coordinated multiple point transmission/reception (CoMP) scheme. Furthermore, the UE feeds back CSI acquired in every CSI process to the eNB based on an independent period and subframe offset.

Figure 5:
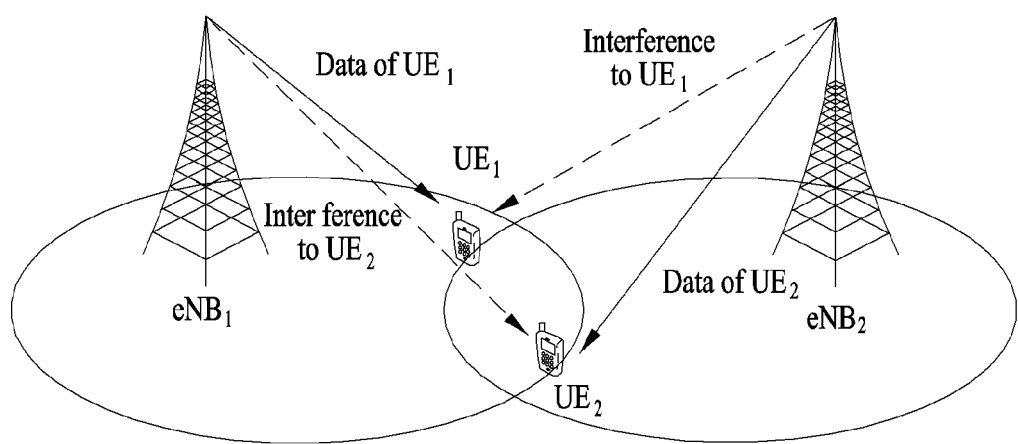
FIG. 5 illustrates an interference environment in a multi-cell environment.

For an enhanced wireless communication system such as LTE Rel-12, a network assisted interference cancellation and suppression (NAICS) scheme for removing interference from a neighboring eNB by a UE based on network assistance is under discussion. FIG. 5 illustrates an interference environment in which data transmitted from $eNB_1$ to $UE_1$ provides interference to $UE_2$ while data transmitted from $eNB_2$ to $UE_2$ provides interference to $UE_1$ when $UE_1$ is served by $eNB_1$ and $UE_2$ is served by $eNB_2$ in an LTE system.

In this case, if $UE_1$ has NAICS capability, $UE_1$ may greatly reduce interference on the data of $UE_1$ by performing NAICS on the data of $UE_2$. For an LTE Rel-12 system, a scheme for reflecting an effect of removing interference by performing NAICS on a signal received from a specific cell in CSI by a NAICS UE is under discussion. Hereinafter, for convenience of explanation, the effect of mitigating interference by performing NAICS is referred to as a NAICS effect in the present invention. For example, the NAICS UE reflects the NAICS effect for a neighboring cell signal transmitted in a physical data shared channel (PDSCH) region at a corresponding timing in interference information measured using a CSI-IM resource. However, if the NAICS UE arbitrarily reflects the NAICS effect for a specific cell in CSI, interference information different from an interference environment assumed by the network in the corresponding CSI-IM resource can be reflected in a CSI feedback procedure.

For example, it is assumed that 3 cells (e.g., $Cell_1$, $Cell_2$ and $Cell_3$) are neighboring cells and a serving cell of $UE_1$ is $Cell_1$. In this case, it is assumed that, to apply a point muting (PM) scheme as one of CoMP schemes, CSI process 1 in which only $CSI-RS_1$ transmitted from $Cell_1$ and a signal transmitted from $Cell_1$ are muted for $UE_1$ and $CSI-IM_1$ is interfered by another cell, and CSI process 2 in which $CSI-RS_1$ transmitted from $Cell_1$ and signals transmitted from $Cell_1$ and $Cell_2$ are muted and $CSI-IM_2$ is interfered by another cell. Here, CSI process 2 assumes an interference environment in which $Cell_2$ performs muting based on the PM scheme while CSI process 1 assumes an interference environment in which $Cell_2$ does not perform muting. In this case, $UE_1$ should not consider A NAICS effect for $Cell_2$ in a CSI calculation procedure of CSI process 2 according to the interference environment assumed by the network. Accordingly, if the NAICS UE arbitrarily reflects the NAICS effect in CSI, interference different from an interference environment assumed by the network in a CSI-IM resource can be measured and reported in a CSI feedback procedure.

Therefore, to solve the above problem, a method for restricting NAICS operation of a NAICS UE only in a CSI feedback procedure is considered. That is, a description is now given of a method for configuring a cluster of a plurality of neighboring cells, defining "NAICS configurations" or "NAICS configuration information" including information about target cells enabled to perform an operation for reflecting a NAICS effect in CSI for CSI feedback per CSI process, and target cells disabled to perform the above-described operation, and specifying a specific NAICS operation for each cell of the cluster in the CSI feedback procedure using each NAICS configuration, by a network. Although the following description is focused on an LTE system, the present invention is extensively applicable to any wireless communication system for performing interference cancellation and suppression (ICS) based on network assistance.

(1) NAICS Configuration (1.1) Targets Enabled to Reflect NAICS Effect in CSI Feedback (1.1.1) List of Cells Enabled to Reflect NAICS Effect in CSI Feedback According to an embodiment of the present invention, a network may configure a cluster of a plurality of cells for NAICS UEs and define a NAICS configuration per CSI process, and the NAICS configuration may include information about cells enabled to reflect a NAICS effect in a CSI feedback procedure among the cells of the cluster. To maximize NAICS capability, the network may indicate a specific cell to maintain interference data characteristics by providing a scheduling restriction to the specific cell. In this case, the network desirably initially receives feedback on how much the scheduling restriction of the specific cell is useful to the NAICS UEs adjacent to the corresponding cell. For example, a NAICS configuration is set per CSI process of the NAICS UE and includes an indication to reflect a NAICS effect for a specific cell in CSI feedback on the assumption that the corresponding cell maintains data characteristics observed in a CSI-IM resource, at a scheduling timing.

As an example of reflecting the NAICS effect, the NAICS UE may actually attempt to perform blind detection (BD) and detection on an interference data signal transmitted in a PDSCH region from a specific cell at an interference measurement timing using a CSI-IM resource, and subtract interference from the specific cell from interference measured in the CSI-IM resource. Alternatively, the NAICS UE may attempt to perform BD and detection on an interference data signal transmitted in the CSI-IM resource from a specific cell, and subtract interference from the specific cell from interference measured in the CSI-IM resource.

The information about the cells enabled to reflect the NAICS effect may be expressed using physical cell identifiers (PCIs). In this case, the NAICS UE reflects the NAICS effect in CSI feedback for specific cells indicated by the NAICS configuration of the CSI process, and does not reflect the NAICS effect in CSI feedback for cells not indicated by the NAICS configuration.

(1.1.2) List of Cells Disabled to Reflect NAICS Effect in CSI Feedback

According to another embodiment of the present invention, the network may configure a cluster of a plurality of cells for NAICS UEs and define a NAICS configuration per CSI process, and the NAICS configuration may include information about cells disabled to reflect a NAICS effect in a CSI feedback procedure among the cells of the cluster. As described above, if the information about the cells not allowed to reflect the NAICS effect is signaled using the NAICS configuration, since a NAICS effect for a specific cell in a CSI process configured to transmit a specific interference signal (e.g., muting) in a CSI-IM resource from the corresponding cell for network coordination such as CoMP is not reflected in a CSI calculation procedure, distortion of an interference environment to be intentionally observed in the CSI process by the network may be prevented.

The information about the cells disabled to reflect the NAICS effect may be expressed using PCIs. In this case, the NAICS UE does not reflect the NAICS effect in CSI feedback for specific cells indicated by the NAICS configuration of the CSI process, and reflects the NAICS effect in CSI feedback for cells not indicated by the NAICS configuration.

(1.1.3) List of Cells Enabled/Disabled to Reflect NAICS Effect in CSI Feedback

According to another embodiment of the present invention, the NAICS configuration may include both of the information about the cells enabled to reflect the NAICS effect in the CSI feedback procedure and the information about the cells disabled to reflect the NAICS effect in the CSI feedback procedure.

Figure 6:
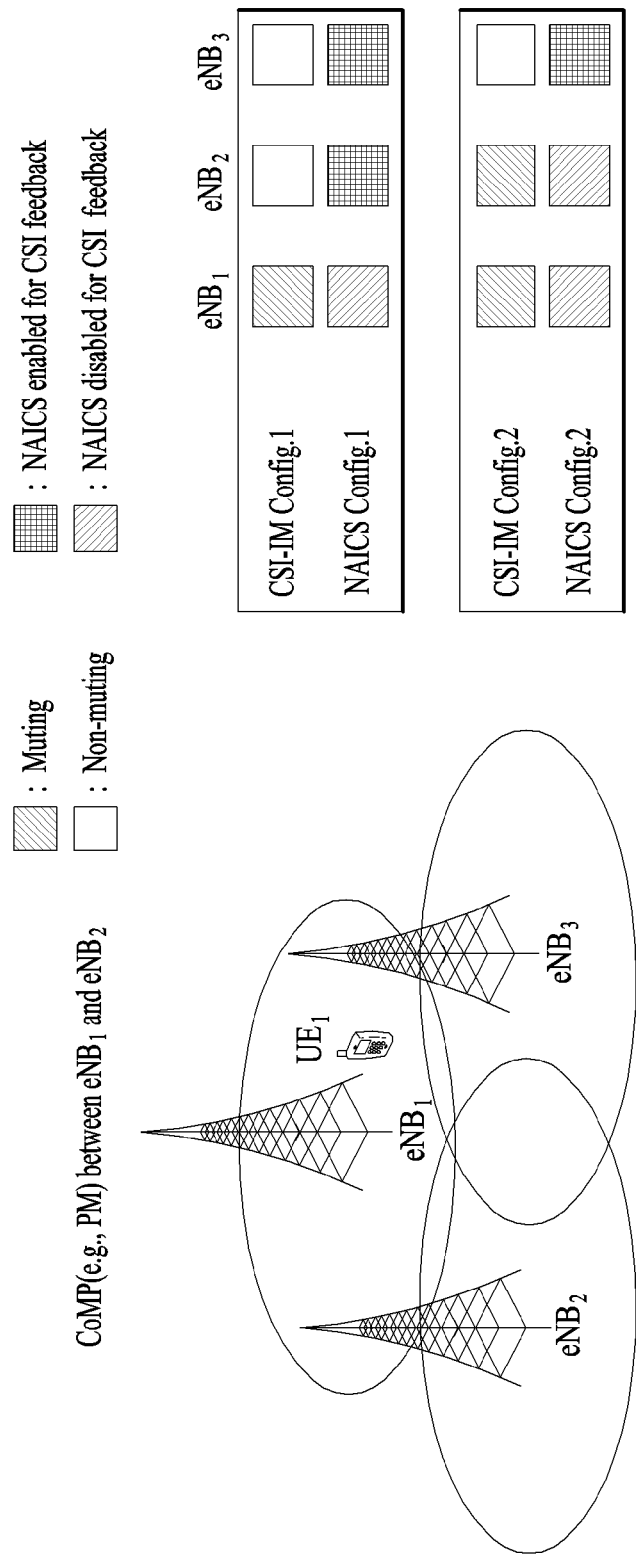
FIG. 6 illustrates interference configuration information configured for each cell according to an embodiment of the present invention.

FIG. 6 illustrates an example of NAICS configurations in consideration of PM scheme as the above CoMP operation. CSI-IM configuration 2 and NAICS configuration 2 indicate configurations in a case when $UE_1$ receives data from $eNB_1$ and $eNB_2$ performs muting operation based on the PM scheme. Accordingly, NAICS configuration 2 configures $eNB_2$ to be disabled to reflect a NAICS effect in a CSI feedback procedure, and configures $eNB_3$ to be enabled to reflect the NAICS effect in the CSI feedback procedure. In this case, cells which are not indicated by the NAICS configurations whether to reflect the NAICS effect may be disabled to reflect the NAICS effect in CSI feedback.

(1.1.4) Information Indicating List of Cells Enabled to Reflect NAICS Effect in CSI Feedback: RS According to another embodiment of the present invention, the above-defined NAICS configuration may include the information about the cells enabled to reflect the NAICS effect in the CSI feedback procedure and the information about the cells disabled to reflect the NAICS effect in the CSI feedback procedure among the cells of the cluster, as a list of reference signals (RSs) corresponding to each cell. It is assumed that an LTE system includes remote radio heads (RRHs) having the same PCI as in CoMP scenario 4 and each RRH performs local transmission as a transmission point (TP). In this case, the NAICS UE may receive support of CoMP operation such as PM scheme from the eNB and the RRHs and receive configuration of a CSI process of an interference environment having no interference from the eNB and the RRHs. Thus, if the information about the cells enabled to reflect the NAICS effect in CSI feedback is expressed using only PCIs, the RRHs having the same PCI as in CoMP Scenario 4 cannot be expressed.

Specifically, the NAICS configuration may express the information about the cells enabled to reflect the NAICS effect, as information about a cell specific reference signal (CRS), a channel state information reference signal (CSI-RS) and a demodulation reference signal (DM-RS) transmitted from each cell. The information about the RSs includes a sequence, an antenna port count, an RE mapping pattern, etc. In this case, if the target cells enabled to reflect the NAICS effect in CSI feedback are signaled using the DM-RS information, the NAICS effect may be selectively reflected based on a specific PDSCH transmission region. For example, in FIG. 6, when CSI-IM configuration 2 and NAICS configuration 2 indicate a configuration in which $UE_1$ receives data from $eNB_1$ and $eNB_2$ performs muting operation based on the PM scheme, NAICS configuration 2 may not directly indicate $eNB_2$ but indicate $CSI-RS_2$ and $DM-RS_2$ which can be transmitted from $eNB_2$.

In this case, quasi co-location (QCL) information among the RSs may also be included in the NAICS configuration. That is, the NAICS configuration may include CRS, CSI-RS and DM-RS signals transmitted from the cells disabled to reflect the NAICS effect in CSI, as one group. Accordingly, the NAICS UE may determine data configured not to reflect the NAICS effect irrespective of CRS based data transmission or DM-RS based data transmission. Specifically, for example, if the network configures the NAICS configuration to indicate not to reflect the NAICS effect in CSI feedback for a specific cell assumed to perform muting based on the PM scheme, zero power (ZP) CSI-RS information in the corresponding specific cell may be signaled as information indicating not to reflect the NAICS effect for the corresponding cell. That is, if CSI-IM and ZP CSI-RS for a specific cell are configured with the same resource, the NAICS UE does not reflect the NAICS effect in CSI for the corresponding cell.

(1.2) NAICS Operation for NAICS Target Cell

According to another embodiment of the present invention, the above-defined NAICS configuration may include the information about the cells enabled to reflect the NAICS effect in the CSI feedback procedure among the cells of the cluster, and characteristics information of interference data transmitted in a CSI-IM resource of each cell, e.g., information about modulation order, number of layers and precoding. The NAICS configuration configured by the network per CSI process is mainly aimed to receive CSI feedback of the NAICS UEs on the assumption that a scheduling restriction is provided to a specific cell. Thus, when a scheduling restriction in modulation order, number of layers and precoding is provided to a specific cell based on network operation scheme, a NAICS gain for the corresponding cell needs to be determined Therefore, according to the current embodiment, the NAICS configuration includes the information about modulation order, number of layers and precoding as the characteristics information of the interference data transmitted from the corresponding cell. In this case, the specific cell enabled to reflect the NAICS effect should transmit an interference signal based on the indicated modulation order, the number of layers and the precoding in a CSI-IM resource of a CSI process corresponding to the NAICS configuration.

(1.3) Scheduling Restriction

According to another embodiment of the present invention, the serving cell may request to provide a scheduling restriction to a specific cell indicated by the NAICS configuration. The serving cell may request the specific cell to configure and maintain the modulation order and the number of layers of a signal transmitted from the specific cell in the latest CSI-IM resource of the serving cell, as the maximum modulation order and the maximum number of layers for subsequent transmission for a specific period of time.

If a CSI process having a NAICS configuration assuming a scheduling restriction of a specific cell has high CSI values in a CSI feedback procedure considering the NAICS configuration, it is preferable that the network actually applies the corresponding NAICS configuration. That is, the serving cell may apply a scheduling restriction to the specific cell for a specific period of time. In this case, a method for preventing interference data characteristics of the specific cell measured in the CSI feedback procedure from varying at a subsequent scheduling timing can be a conservative scheduling restriction method. Since the NAICS effect is generally increased when the modulation order and the number of layers of the interference signal are reduced, if the modulation order or the number of layers at the subsequent scheduling timing is reduced compared to the interference data characteristics of the specific cell measured in the CSI feedback procedure, it can be expected that at least reception failure (i.e., NACK) due to overestimation of its NAICS capability in CSI feedback is not caused often.

Figure 7:
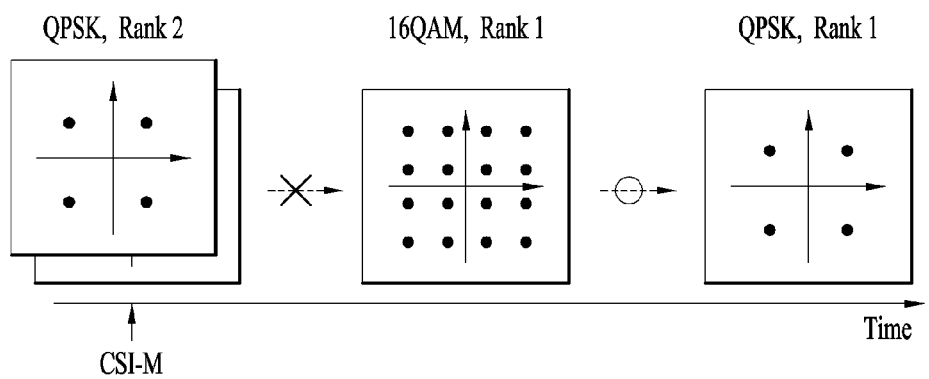
FIG. 7 illustrates a scheduling restriction of an interfering cell based on interference configuration information according to an embodiment of the present invention.

FIG. 7 illustrates that, when an interference signal of a specific neighboring cell is based on QPSK and rank 2 at a CSI-IM measurement timing and a serving cell transmits a scheduling restriction request to the specific neighboring cell according to the current embodiment, the serving cell requests to transmit interference data following a modulation order equal to or less than QPSK (e.g., QPSK) and a rank equal to or less than rank 2 (e.g., rank 1 or 2) for a subsequent specific period of time. An example marked "X" indicates incorrect operation of the specific neighboring cell, and an example marked "O" indicates appropriate operation of the specific neighboring cell based on the scheduling restriction request.

In this case, if the network has a centralized architecture and thus a center cell is present as a higher cell of the cluster of a plurality of cells, determination of the preferable NAICS configuration and transmission of the scheduling restriction request may be performed by the center cell other than the serving cell.

(2) Cells Enabled to Reflect NAICS Effect in CSI Feedback Procedure Irrespective of NAICS Configuration (2.1) Dynamic Signaling of Scheduling Restriction Information of Neighboring Cell: Based on Demodulation Reference Signal (DM-RS)

According to another embodiment of the present invention, an arbitrary cell may transmit a specific DM-RS sequence to the NAICS UEs at a specific transmission timing to signal that data characteristics (e.g., modulation order, number of layers and precoding) of the specific transmission timing will be maintained for a specific period of time from the transmission timing. Although the network can apply a scheduling restriction to a specific cell using a NAICS configuration according to the operation of the present invention, the scheduling restriction is not performed rapidly because information moves over a non-ideal backhaul (NIB) between cells in the network. Furthermore, if the NAICS configuration is associated with a CSI process, the number of CSI processes is restricted and thus scheduling restrictions of only some cells are considered. Meanwhile, when the arbitrary cell does not serve the NAICS UEs, since the NAICS effect is not reflected in CSI feedback, it can be expected that data characteristics probably vary at low speed. Accordingly, a cell for scheduling NAICS non-capable UEs or UEs not performing NAICS operation may not have a large amount of loss in performance even when interference signal characteristics are maintained for a specific period of time by applying a scheduling restriction. In this case, preferably, the corresponding cell applies the scheduling restriction and directly signals corresponding information to the NAICS UEs. To this end, alternatively or additionally to the above-described embodiments, the current embodiment of the present invention proposes a method for transmitting data using a predefined specific DM-RS sequence at a specific transmission timing when a scheduling restriction of a neighboring cell is applied. In this case, the NAICS UE may determine whether a scheduling restriction is applied to the corresponding cell by detecting the specific DM-RS sequence. The above scheduling restriction may correspond to an operation for maintaining data characteristics (e.g., modulation order, number of layers and precoding) of the specific transmission timing for a specific period of time or an operation for restricting the modulation order, the number of layers and the precoding indicated by the data characteristics to values of a specific range for a specific period of time. Information about the specific period of time and the restricted data characteristics may be pre-configured through higher layer signaling such as RRC signaling.

(2.2) Dynamic Signaling of Scheduling Restriction Information of Neighboring Cell: Based on CSI-IM According to another embodiment of the present invention, an arbitrary cell may transmit a specific sequence to the NAICS UEs in a specific CSI-IM resource to signal that data characteristics (e.g., modulation order, number of layers and precoding) of the corresponding CSI-IM resource will be maintained for a specific period of time from the transmission timing of the specific sequence. In the method for transmitting data based on a specific DM-RS sequence at a specific transmission timing by a neighboring cell to signal scheduling restriction information of the corresponding cell according to the above operation of the present invention, signaling of the scheduling restriction information using the DM-RS sequence may not be preferable when data to be transmitted is not present at the corresponding timing or when data to be transmitted is present but a DM-RS based transmission scheme is not used. Accordingly, alternatively or additionally to the data transmission method based on the DM-RS sequence, transmission of a specific sequence in a specific CSI-IM resource may be considered. A scheduling restriction is indicated by the specific sequence transmitted in the CSI-IM resource, and may correspond to an operation for maintaining data characteristics (e.g., modulation order, number of layers and precoding) of the CSI-IM transmission timing for a specific period of time or an operation for restricting the modulation order, the number of layers and the precoding indicated by the data characteristics, as the maximum values for a specific period of time. Information about the specific period of time and the restricted data characteristics may be pre-configured through higher layer signaling such as RRC signaling.

(2.3) Information about Scheduling Timing

According to another embodiment of the present invention, the serving cell may signal information about a time at which corresponding CSI is reflected in scheduling at a CSI feedback transmission or reception timing, to the NAICS UEs. If a neighboring cell can directly signal scheduling restriction information thereof to the NAICS UE according to the operation of the present invention, the NAICS UE should be able to determine whether the scheduling restriction information of the neighboring cell is valid for subsequent scheduling. Accordingly, the present invention proposes a method for signaling a processing delay of CSI and a scheduling period based on the CSI as information about a time at which the corresponding CSI is reflected in scheduling at a CSI feedback transmission or reception timing, to the NAICS UEs by the serving cell. In this case, the NAICS UE may determine whether a scheduling restriction of the neighboring cell is also valid at a scheduling timing of the serving cell, and reflect the NAICS effect for the corresponding cell in CSI feedback if the scheduling restriction is valid. Upon determining that the scheduling restriction is not valid, the NAICS effect for the corresponding cell may not be reflected in CSI feedback. That is, the NAICS UE may determine whether an immediately subsequent scheduling timing or period overlaps with a time for which the scheduling restriction of the neighboring cell is maintained, based on the above information about the time at which CSI is reflected in scheduling.

Figure 8:
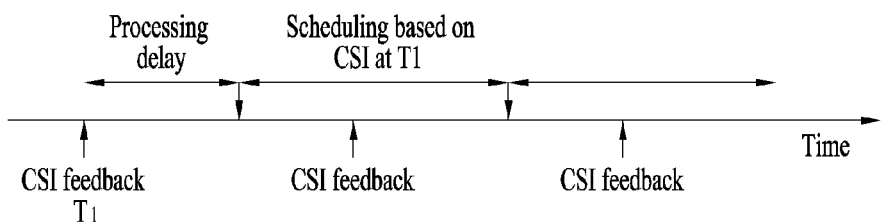
FIG. 8 illustrates scheduling information of a serving cell.

FIG. 8 illustrates an example of the above operation.

In this case, the reference timing is not limited to the CSI feedback timing and the serving cell may signal the reference timing through higher layer signaling such as RRC signaling as necessary.

Figure 9:
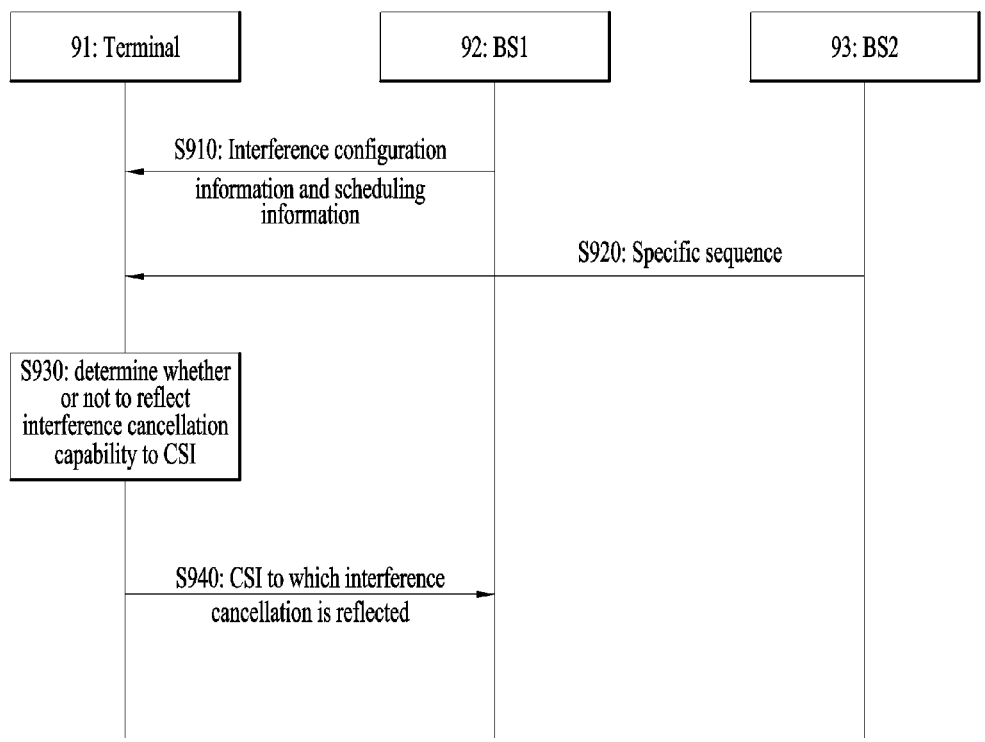
FIG. 9 illustrates operation according to an embodiment of the present invention.

FIG. 9 illustrates operation according to an embodiment of the present invention.

A terminal 91 may receive interference configuration information indicating a first group of cells or BSs corresponding to targets for which interference cancellation capability is reflected, and scheduling information of a serving cell or BS 92, from the serving cell or BS (S910). The terminal may also receive a specific sequence transmitted from a second group of cells or BSs 93 (S920). The first group of cells or BSs may be cells or BSs other than the serving cell or BS of the terminal and, more particularly, cells or BSs which provide interference to the terminal. The second group of cells or BSs may be candidate cells capable of reflecting the interference cancellation capability other than the serving cell or BS.

The terminal may determine whether to reflect the interference cancellation capability for the first group of cells or BSs and the second group of cells or BSs, using the interference configuration information, the scheduling information or the specific sequence (S930).

If the cells or BSs for which the interference cancellation capability is reflected are determined, the terminal may remove interference signals from the corresponding cells or BSs when calculating CSI. After that, the terminal may transmit the CSI having reflected the interference cancellation capability therein to the serving cell or BS (S940).

The specific sequence may indicate that the second group of cells or BSs perform restricted scheduling for a specific period of time. Accordingly, upon receiving the specific sequence from a specific cell or BS belonging to the second group of cells or BSs, the terminal may determine that the corresponding cell or BS performs restricted scheduling for the specific period of time, and thus remove interference from the cell or BS having transmitted the specific sequence. Here, information about the specific period of time and the restricted scheduling may be transmitted to the terminal through semi-static signaling or dynamic signaling, or may be predefined for the terminal.

The first group of cells or BSs may be indicated using physical cell identifiers (PCIs) or reference signal information, and the reference signal information may include a reference signal sequence, a transmit antenna port count or a resource element (RE) mapping pattern.

The interference configuration information includes information about characteristics of interference signals transmitted from the first group of cells or BSs, and the information about the characteristics of the interference signals may include information about modulation order, number of layers or precoding. The terminal may remove interference signals from the corresponding cell or BS using the characteristics of the interference signals.

The scheduling information of the serving cell includes information about a processing delay of CSI and a scheduling period based on the CSI at a specific timing, and the specific timing may be pre-configured or configured through higher layer signaling.

If the specific period of time overlaps with the scheduling period based on the CSI, the terminal may determine to reflect the interference cancellation capability for the second group of cells or BSs. That is, the terminal may not unconditionally reflect the interference cancellation capability for the cell or BS having transmitted the specific sequence, but may determine to reflect the interference cancellation capability for corresponding cells or BSs only when a scheduling restriction period of the cell or BS having transmitted the specific sequence overlaps with a scheduling period of the serving cell or BS.

Operation of the terminal is described as an embodiment of the present invention in FIG. 9, and it should be understood by one of ordinary skill in the art that a combination of two or more of the above-described embodiments may be implemented by the terminal.

Figure 10:
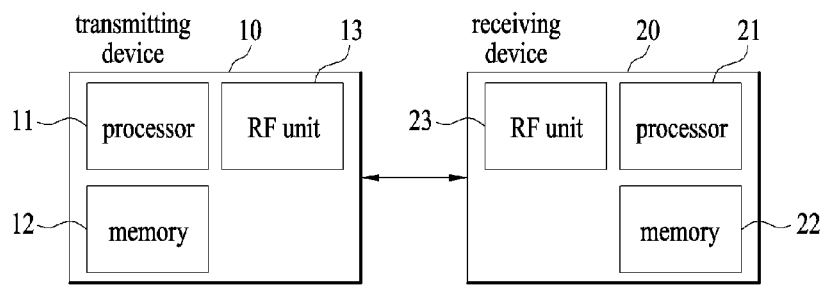
FIG. 10 is a block diagram of devices according to embodiment(s) of the present invention.

FIG. 10 is a block diagram of a transmitting device 10 and a receiving device 20 configured to implement exemplary embodiments of the present invention. Referring to FIG. 10, the transmitting device 10 and the receiving device 20 respectively include radio frequency (RF) units 13 and 23 for transmitting and receiving radio signals carrying information, data, signals, and/or messages, memories 12 and 22 for storing information related to communication in a wireless communication system, and processors 11 and 21 connected operationally to the RF units 13 and 23 and the memories 12 and 22 and configured to control the memories 12 and 22 and/or the RF units 13 and 23 so as to perform at least one of the above-described embodiments of the present invention.

The memories 12 and 22 may store programs for processing and control of the processors 11 and 21 and may temporarily storing input/output information. The memories 12 and 22 may be used as buffers. The processors 11 and 21 control the overall operation of various modules in the transmitting device 10 or the receiving device 20. The processors 11 and 21 may perform various control functions to implement the present invention. The processors 11 and 21 may be controllers, microcontrollers, microprocessors, or microcomputers. The processors 11 and 21 may be implemented by hardware, firmware, software, or a combination thereof. In a hardware configuration, Application Specific Integrated Circuits (ASICs), Digital Signal Processors (DSPs), Digital Signal Processing Devices (DSPDs), Programmable Logic Devices (PLDs), or Field Programmable Gate Arrays (FPGAs) may be included in the processors 11 and 21. If the present invention is implemented using firmware or software, firmware or software may be configured to include modules, procedures, functions, etc. performing the functions or operations of the present invention. Firmware or software configured to perform the present invention may be included in the processors 11 and 21 or stored in the memories 12 and 22 so as to be driven by the processors 11 and 21.

The processor 11 of the transmitting device 10 is scheduled from the processor 11 or a scheduler connected to the processor 11 and codes and modulates signals and/or data to be transmitted to the outside. The coded and modulated signals and/or data are transmitted to the RF unit 13. For example, the processor 11 converts a data stream to be transmitted into K layers through demultiplexing, channel coding, scrambling and modulation. The coded data stream is also referred to as a codeword and is equivalent to a transport block which is a data block provided by a MAC layer. One transport block (TB) is coded into one codeword and each codeword is transmitted to the receiving device in the form of one or more layers. For frequency up-conversion, the RF unit 13 may include an oscillator. The RF unit 13 may include Nt (where Nt is a positive integer) transmit antennas.

A signal processing process of the receiving device 20 is the reverse of the signal processing process of the transmitting device 10. Under the control of the processor 21, the RF unit 23 of the receiving device 10 receives RF signals transmitted by the transmitting device 10. The RF unit 23 may include Nr receive antennas and frequency down-converts each signal received through receive antennas into a baseband signal. The RF unit 23 may include an oscillator for frequency down-conversion. The processor 21 decodes and demodulates the radio signals received through the receive antennas and restores data that the transmitting device 10 wishes to transmit.

The RF units 13 and 23 include one or more antennas. An antenna performs a function of transmitting signals processed by the RF units 13 and 23 to the exterior or receiving radio signals from the exterior to transfer the radio signals to the RF units 13 and 23. The antenna may also be called an antenna port. Each antenna may correspond to one physical antenna or may be configured by a combination of more than one physical antenna element. A signal transmitted through each antenna cannot be decomposed by the receiving device 20. A reference signal (RS) transmitted through an antenna defines the corresponding antenna viewed from the receiving device 20 and enables the receiving device 20 to perform channel estimation for the antenna, irrespective of whether a channel is a single RF channel from one physical antenna or a composite channel from a plurality of physical antenna elements including the antenna. That is, an antenna is defined such that a channel transmitting a symbol on the antenna may be derived from the channel transmitting another symbol on the same antenna. An RF unit supporting a MIMO function of transmitting and receiving data using a plurality of antennas may be connected to two or more antennas.

In embodiments of the present invention, a UE serves as the transmission device 10 on uplink and as the receiving device 20 on downlink. In embodiments of the present invention, an eNB serves as the receiving device 20 on uplink and as the transmission device 10 on downlink.

The transmitting device and/or the receiving device may be configured as a combination of one or more embodiments of the present invention.

The embodiments of the present application has been illustrated based on a wireless communication system, specifically 3GPP LTE (-A), however, the embodiments of the present application can be applied to any wireless communication system in which interferences exist.

According to an embodiment of the present invention, since channel state information (CSI) having reflected interference cancellation capability therein is reported, overall system performance may be improved.

The detailed description of the exemplary embodiments of the present invention has been given to enable those skilled in the art to implement and practice the invention. Although the invention has been described with reference to the exemplary embodiments, those skilled in the art will appreciate that various modifications and variations can be made in the present invention without departing from the spirit or scope of the invention described in the appended claims. For example, those skilled in the art may use each construction described in the above embodiments in combination with each other. Accordingly, the invention should not be limited to the specific embodiments described herein, but should be accorded the broadest scope consistent with the principles and novel features disclosed herein.

What is claimed is:

1. A method for reporting channel state information (CSI) having reflected interference cancellation capability therein in a wireless communication system, the method being performed by a terminal and comprising:
   receiving interference configuration information, indicating a first group of cells corresponding to targets for which interference cancellation capability is reflected, and scheduling information of a serving cell, from the serving cell;
   receiving a specific sequence transmitted from a second group of cells;
   determining whether to reflect the interference cancellation capability for the first group of cells using the interference configuration information and the scheduling information;
   determining whether to reflect the interference cancellation capability for the second group of cells using the scheduling information and the specific sequence; and
   transmitting CSI having reflected the interference cancellation capability therein,
   wherein the second group of cells correspond to candidate cells capable of reflecting the interference cancellation capability other than the indicated first group of cells.

2. The method according to claim 1, wherein the specific sequence indicates that the second group of cells perform restricted scheduling for a specific period of time.

3. The method according to claim 1, wherein:
   the first group of cells are indicated by physical cell identifiers (PCIs) or reference signal information; and
   the reference signal information comprises a sequence of a reference signal, a number of transmission antenna ports, or a resource element (RE) mapping pattern.

4. The method according to claim 1, wherein:
   the interference configuration information comprises information about characteristics of interference signals transmitted from the first group of cells; and
   the information about the characteristics of the interference signals comprises information about modulation order, a number of layers, or precoding.

5. The method according to claim 1, wherein:
   the scheduling information of the serving cell comprises information about a delay for processing the CSI and a scheduling period based on the CSI at a specific timing; and
   the specific timing is pre-configured or configured through higher layer signaling.

6. The method according to claim 2, wherein, if the specific period of time overlaps with the scheduling period based on the CSI, the interference cancellation capability is determined to be reflected for the second group of cells.

7. The method according to claim 1, wherein the interference configuration information includes information indicating one or more cells corresponding to targets for which interference cancellation capability is not reflected.

8. A terminal configured to report channel state information (CSI) in a wireless communication system, the terminal comprising:
   a radio frequency (RF) unit; and
   a processor configured to:
     control the RF unit;
     receive interference configuration information indicating a first group of cells corresponding to targets for which interference cancellation capability is reflected, and scheduling information of a serving cell, from the serving cell;
     receive a specific sequence transmitted from a second group of cells;
     determine whether to reflect the interference cancellation capability for the first group of cells using the interference configuration information and the scheduling information;
     determine whether to reflect the interference cancellation capability for the second group of cells using the scheduling information and the specific sequence; and
     transmit CSI having reflected the interference cancellation capability therein,
   wherein the second group of cells correspond to candidate cells capable of reflecting the interference cancellation capability other than the indicated first group of cells.

9. The terminal according to claim 8, wherein the specific sequence indicates that the second group of cells perform restricted scheduling for a specific period of time.

10. The terminal according to claim 8, wherein:
    the first group of cells are indicated by physical cell identifiers (PCIs) or reference signal information; and
    the reference signal information comprises a sequence of a reference signal, a number of transmission antenna ports, or a resource element (RE) mapping pattern.

11. The terminal according to claim 8, wherein:
    the interference configuration information comprises information about characteristics of interference signals transmitted from the first group of cells; and
    the information about the characteristics of the interference signals comprises information about modulation order, a number of layers, or precoding.

12. The terminal according to claim 8, wherein:
    the scheduling information of the serving cell comprises information about a delay for processing the CSI and a scheduling period based on the CSI at a specific timing; and
    the specific timing is pre-configured or configured through higher layer signaling.

13. The terminal according to claim 9, wherein, if the specific period of time overlaps with the scheduling period based on the CSI, the interference cancellation capability is determined to be reflected for the second group of cells.

14. The terminal according to claim 8, wherein the interference configuration information includes information indicating one or more cells corresponding to targets for which interference cancellation capability is not reflected.

* * * * *